June 14, 1927.  1,632,592
H. G. FRENCH
ELECTRIC SWITCH
Filed Sept. 23, 1925
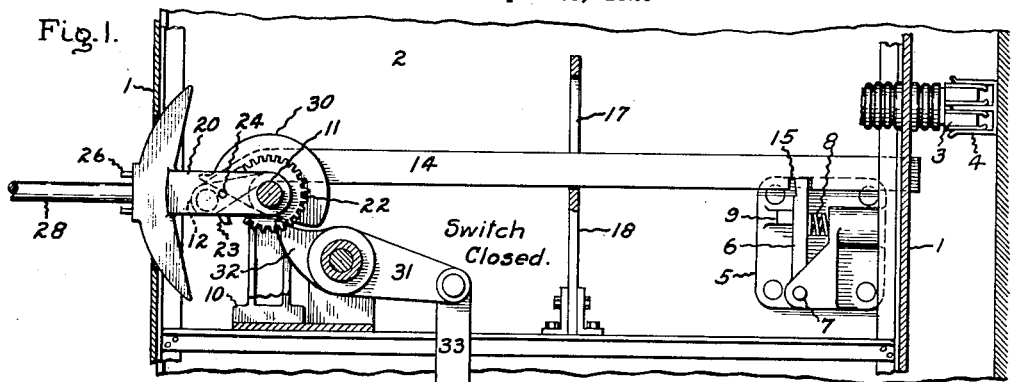
Inventor:
Henry G. French,
by Alexander S. ——
His Attorney.

Patented June 14, 1927.

1,632,592

UNITED STATES PATENT OFFICE.

HENRY G. FRENCH, OF SCHENECTADY, NEW YORK, ASSIGNOR TO GENERAL ELECTRIC COMPANY, A CORPORATION OF NEW YORK.

ELECTRIC SWITCH.

Application filed September 23, 1925. Serial No. 58,173.

My invention relates to electric switches of the truck panel type and particularly to mechanism for moving the truck panel in its housing.

An object of my invention is the provision of improved means operable from the front of the panel for forcing the truck panel into its final contact engaging position and for withdrawing it from that position.

A further object of my invention is the provision of means for tripping the switch to open circuit position upon the initial operation of the means for withdrawing the truck from its housing.

My invention will be better understood from the following description taken in connection with the accompanying drawing, and its scope will be pointed out in the appended claims.

Referring to the drawing which illustrates one embodiment of my invention, Fig. 1 shows a fragmentary sectional view taken on the line 1—1 of Fig. 3, the truck panel being in its "full in" position in its housing; Fig. 2 is similar to Fig. 1 except that the truck panel is partly withdrawn from the housing; Fig. 3 is a fragmentary front elevation of the truck panel and housing; and Fig. 4 is a detail.

In the drawing, the truck panel 1 which carries a switch, not shown, which may be an oil switch, is constructed to be rolled in and out of the housing 2. The circuit to the switch is completed when the truck panel is in its "full in" position by cooperating contacts 3 and 4 carried respectively by the truck panel and the housing. These contacts usually fit snugly and for this reason considerable force is required to move the truck panel while the contacts are in engagement. When the contacts are not in engagement the truck panel may readily be rolled in and out of the housing by the use of handles on the face of the truck panel.

The mechanism which I have devised for drawing the truck panel into its final "full in" position and for withdrawing it from that position comprises a plate 5 which is secured to the side of the housing 2 and which has a member 6 pivoted thereto at 7. A coil spring 8 engaging the rear of the member 6 resiliently holds that member against stop 9 on plate 5. Near the front of the truck panel are bearing blocks 10 in which is journalled the transverse shaft 11. A crank 12 is secured to each end of the shaft and to each crank is pivoted one end of an actuating bar or member 14 having near its opposite end the notch 15 adapted to receive the member 6. At a point intermediate its ends the bar 14 passes through the opening 17 in the guide 18, the bottom of the opening being at such a height that when the crank 12 is turned to the position shown in Fig. 2, the rear end of the bar 14 is lifted clear of the member 6.

For rotating the shaft 11 I have provided an oscillatable member 20 having a bifurcated rear portion which is loosely mounted on the shaft and a winged forward portion which projects through a suitable opening in the face of the truck panel. Oscillatory movement of the member 20 is transmitted to the shaft 11 by means of a ratchet mechanism comprising a toothed wheel 22 keyed to the shaft and a double pawl 23 pivoted to member 20 at 24. By means of the spring 25 the pawl is biased in either one of two positions whereby oscillatory movement of member 20 produces rotative movement of shaft 11 in either a clockwise or a counter clockwise direction. Plungers 26 are provided in the member 20 for throwing the pawl to the one or the other position as desired. Member 20 is shown provided with a central opening 27 which is adapted to receive any suitable bar 28 long enough to obtain the desired leverage whereby the operator from a position in front of the truck panel may oscillate member 20 to move the truck panel while the contacts 3 and 4 are in engagement.

With the parts in the position shown by Figs. 1 and 4, reciprocating movement of the handle 28 will cause clockwise rotation of the shaft 11 rotating the crank 12 to the position shown in Fig. 2. The resulting thrust exerted by the actuating bar 14 against member 6 on the housing causes the truck panel to be pushed out of the housing. As the crank 12 approaches the position shown in Fig. 2, the bar 14 rocks on the guide 18 sufficient to lift its opposite end out of engagement with the member 6 so that the truck panel may then be rolled out completely by hand. By the reverse operation the truck panel having been partly pushed into the housing by hand is drawn in the remaining distance by operating the hand lever 28, the pawl 23 being of course reversed to reverse direction of rotation of shaft 11.

To prevent either pushing in the truck panel to cause the contacts 3 and 4 to engage or withdrawing the same to open the circuit at that point, while the switch is closed, which, as is well known, might result in the severe burning of the contacts, I have provided the cam 30 on the shaft 11 and the lever 31 having a tail 32 to which lever is pivoted link 33 which by means not shown is connected to the tripping mechanism of the oil switch. The cam is so arranged that with the truck panel in its "full in" position as shown in Fig. 1 and with the oil switch closed, initial movement of the shaft in a clockwise direction to withdraw the truck panel is prevented by the cam striking the tail 32 of lever 31. Tripping of the oil switch rocks the lever 31 to the position shown in Fig. 2 in which position the cam is free to rotate. If after the truck panel has been withdrawn, the shaft and cam should for any reason be returned to the position shown in Fig. 1 and the truck panel rolled into the housing with the oil switch closed, the rear end of the bar 14 would be stopped by the spring cushioned member 6 on the housing and prevent the contacts 3 and 4 from being brought within striking distance of each other. Only by first tripping the oil switch and then by rotating the shaft to raise the bar can the panel be pushed into the housing sufficiently to cause contacts 3 and 4 to connect.

What I claim as new and desire to secure by Letters Patent of the United States, is,—

1. In combination, a truck panel, a housing therefor, cooperating contacts carried respectively by the truck panel and the housing an oscillatable member arranged at the face of the truck panel, an actuating member adapted to move the truck panel relative to the housing and selective means operable from the face of the truck panel for connecting the oscillatable member with the actuating member whereby oscillation of the oscillatable member moves the truck panel either in or out of the housing.

2. In combination, a truck panel adapted to carry an electric switch, a housing for the truck panel, cooperating contacts carried respectively by the truck panel and the housing, mechanism for moving the truck panel relative to the housing comprising a shaft, an oscillatable member projecting through the face of the truck panel, a reversible ratchet mechanism for moving the shaft from the oscillatable member and ratchet reversing means carried by the oscillatable member and operable from the front of the truck panel 3. In combination, a truck panel adapted to carry an electric switch, a housing for the truck panel, cooperating contacts carried respectively by the truck panel and the housing, mechanism for moving the truck panel relative to the housing comprising a shaft, an oscillatable member mounted thereon having lateral extensions, said truck panel having an opening adapted to receive the oscillatable member and to be closed by said extensions, a ratchet wheel secured to said shaft, a double ended pawl carried by the oscillatable member, resilient means for holding the pawl with one or the other end thereof in engagement with the ratchet wheel, and means carried by the oscillatable member and operable from the front of the truck panel for moving the pawl to one or the other of its operative positions.

In witness whereof, I have hereunto set my hand this 22nd day of September, 1925.

HENRY G. FRENCH.